United States Patent Office 3,700,641
Patented Oct. 24, 1972

3,700,641
PRODUCTION OF STABLE UREA, FORMALDE-HYDE, POLYAMINE CONDENSATION PRODUCTS
Karl-Heinz Jung and Klaus-Gunther Gartner, Troisdorf, Germany, assignors to Dynamit Nobel Aktiengesellschaft
No Drawing. Continuation-in-part of application Ser. No. 64,010, July 17, 1970, which is a continuation-in-part of abandoned application Ser. No. 667,332, Sept. 11, 1967. This application Apr. 8, 1971, Ser. No. 132,564
Claims priority, application Germany, Sept. 10, 1966, D 51 07 439
Int. Cl. C08g 9/10
U.S. Cl. 260—70 R                                    4 Claims

ABSTRACT OF THE DISCLOSURE

Condensation product of urea, formaldehyde and at least two different polyamines of the formula

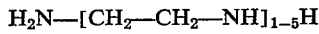

in mole ratio of 1:2 to 2.8:0.1 to 0.2 respectively at 70 to 100° C.; and acidifying to a pH of 4.0 to 4.5, and then at a pH of about 4 to 6. Product has good solution stability and paper impregnated therewith has improved wet strength.

---

This application is a continuation-in-part of application Ser. No. 64,010, filed July 17, 1970, and now abandoned, which in turn is a streamlined continuation of application Ser. No. 667,332, filed Sept. 11, 1967 now abandoned.

It is in the prior art to impregnate paper with solutions of urea-formaldehyde resins. In this process, it proves to be disadvantageous that the resin solutions used for the impregnation have poor keeping qualities, i.e., the resin easily separates. When these solutions are used, this resin separation results in flaws in the paper. Fundamentally, resin solutions can be produced which are relatively stable, but as a general rule, the greater their stability in solution, the poorer the wet-strengthening action of such resins on paper. Successful attempts have been made to perform the condensation of urea and formaldehyde in the presence of polyamines to obtain condensation products which combine good stability in solution with a good wet-strengthening action. Several processes are known (Can. Pat. 467,505, Brit. Pat. 753,142 and German Green Patent 1,187,794) which operate on this principle. It is common to all of these processes that first, the urea and formaldehyde are alkalinely precondensed at elevated temperature, and then the condensation is continued in an acid medium, the polyamine being added either during the alkaline or during the acid reaction.

It is an object of this invention to provide a novel urea, formaldehyde, polyamine condensation product. It is another object of this invention to provide a novel process of producing such product.

Other and additional objects of this invention will become apparent from a consideration of this entire specification, including the claims hereof.

In accord with and fulfilling these objects, one aspect of this invention is a process for the manufacture of water solution-stable resins on the basis of urea, formaldehyde and polyamines of the general formula $$H_2N-(CH_2-CH_2-NH)_xH$$

($x=1$ to 5), wherein the urea and formaldehyde are precondensed in an aqueous solution with a polyamine mixture of two or more components in a molar ratio of urea to formaldehyde to polyamine of from 1:2:01 to 1:2.8:0.2, preferably of 1:2.2–2.5:0.12–0.15, at 70 to 100° C. for three to sixty minutes, preferably at 90 to 100° C. for three to fifteen minutes, acidified to a pH of about 4.0 to 4.5; and the condensation is continued at 65 to 95° C. for 2 to 5 hours, preferably at 90° C. for 2 to 3 hours, at a pH of about 4 to 6. The resin solution is neutralized with alkali lye after it has been cooled to room temperature. Not only formic acid, but also other organic acids, such as malonic acid, or mineral acids, such as hydrchloric acid, can serve as the acidifying material, the only important thing being to maintain the above-stated pH range.

It has been found that the resin solutions manufactured according to this process surprisingly exhibit an excellent aqueous solution stability (at least 6 months), as well as a high wet-strengthening action. The resins according to the invention further produce an improvement in wet-strengthening action that is at least 20% better than that achieved by commercial products.

The following examples are illustrative of the practice of this invention without being limiting thereon.

EXAMPLE 1

65.5 kg. of ethylene diamine and 24 kg. of diethylene triamine are placed in 2300 kg. of formalin (30%) are warmed to 60° C. and dissolved and then 600 kg. of urea are added thereto. The reaction mixture is heated for about 5 minutes at 95 to 100° C. after cooling to 90° C. the pH is adjusted to 4.5 by the addition thereto of 50% formic acid solution and the condensation is then continued for half an hour at 90° C. After addition of 400 kg. water the pH is now adjusted to 4.0 by 50% formic acid and condensation is continued for 2.5 hours. The value pH has then changed approximately to 6. After cooling to room temperature, neutralization to pH 7 is performed with 34% caustic soda solution.

EXAMPLE 2

The procedure is the same as in Example 1, but instead of 24 kg. of diethylene triamine, 26.6 kg. of tetraethylene pentamine are used.

EXAMPLE 3

The procedure is the same as in Example 1, but 28.6 kg. of diethylene triamine and 53 kg. of tetraethylene pentamine are used as the polyamine mixture.

In the following table, the wet-strengthening effect of resins, according to the invention, is compared with that of a commercial product. The testing was performed by the customary methods.

| Resin: | Remaining wet breaking strength in percent of the dry strength |
|---|---|
| Resin of Example 1 | 57.8 |
| Resin of Example 2 | 53.8 |
| Commercial product | 42.8 |

The mentioned commercial product will be made as follows: In a heatable and coolable container with an agitator there are mixed by stirring 2300 weight parts of a formaldehyde solution (30%) with 600 weight parts of urea. In this solution there are added by continuous stirring 206.5 weight parts of a 69.5 aqueous solution of ethylene-diamine. The temperature of this solution is increased by itself to 60° C. and will be brought to 70° C. by heating. At this temperature the solution is stirred for one hour. Then 58 parts of an 85% formic acid are added. The solution has a pH value of 4.2. By the nascent heat of reaction the temperature begins to increase. The solution is cooled again to 70° C. and is stirred at this temperature so long till the product becomes gelatinous. This will last approximately 3 hours. As soon as a heat test portion taken from the resin solution with pouring out can be drawn in a kind of filaments 900 weight parts of a 30 % formaldehyde solution will quickly be mixed with it by stirring. By adding the cold formaldehyde solution the temperature has been fallen to approximately 60° C. The solution temperature is now again heated to 70° C. 68 parts of sodium carbonate (20%) are added. The pH value of the solution is 6.6. Then this is stirred for one hour at 70° C. and cooled again by stirring.

Certain comparative tests have been conducted to establish the efficacy of using the combination of amines according to this invention as opposed to utilizing individual amines to carry out the same condensation.

In the following tests the procedure of Example 1 above was followed.

In comparative Example A, the amine was 90 kg. of ethylene diamine and in comparative Example B there was used 92 kg. of tetraethylene pentamine.

The condensation products of comparative Examples A, B and 1 above were each dissolved in water to form a 2% solution which was then acidified with formic acid to a pH of 4.3. Strips of paper measuring 27.5 cm. by 1.5 cm. were each impregnated with these three solutions respectively and the impregnated paper was dried for 15 minutes at 130° C. Part of these dried impregnated strips were soaked and stored in water for five hours and part were maintained dry. All of the strips were then tested to determine the strength retention qualities thereof. It was found that the paper impregnated with the condensation product of comparison Example A was substantially colorless and retained 42.8% of its dry breaking strength after being soaked in water as set forth above.

It was found that the paper impregnated with comparative Example B retained 58.2% of its drying breaking strength after the water soaking treatment set forth above. However, this product was yellow colored.

It was found that the paper impregnated with the mixed amine condensation product as set forth hereinabove according to Example 1 retained 57.8% of its dry breaking strength even after being soaked in water as set forth above and in addition retained its colorless qualities.

What is claimed is:

1. Process for the manufacture of solution-stable resins based on urea, formaldehyde and at least two polyamines of the general formula:

$$H_2N-[CH_2-CH_2-NH]_xH$$

wherein $x = 1$ to 5
in a mole ratio respectively of 1:2 to 2.8:0.1 to 0.2 which process comprises condensing such in a first stage at 70 to 100° C. for 3 to 60 minutes; acidifying to a pH of 4.0 to 4.5; and then condensing in a second stage at a pH of 4 to 6 in aqueous acid solution at 65 to 95° CC. for 2 to 5 hours.

2. Process as claimed in claim 1, wherein said mole ratio is about 1:2.2 to 2.5:0.12 to 0.15; said first temperature is about 90 to 100° C.; said first reaction time is about 3 to 15 minutes; said second temperature is about 90° C. and said second reaction time is about 2 to 3 hours.

3. Process as claimed in claim 1 wherein the condensation product is cooled to room temperature and then neutralized with an alkaline substance.

4. The product of the process of claim 1.

References Cited

UNITED STATES PATENTS 2,786,823  3/1957  Keim.
3,073,800  1/1963  Poon.

FOREIGN PATENTS 761,822  11/1956  Great Britain.
626,115  6/1963  Belgium.

WILLIAM H. SHORT, Primary Examiner

T. E. PERTILLA, Assistant Examiner

U.S. Cl. X.R.

117—155 L; 260—29.2 N, 69 R